United States Patent [19]
Ishida et al.

[11] 3,933,603
[45] Jan. 20, 1976

[54] ELECTROLYSIS OF ALKALI METAL CHLORIDE

[75] Inventors: Yoshio Ishida, Asahi; Hiroshi Ono; Reiji Takemura, both of Miyazaki, all of Japan

[73] Assignee: Asahi Kasei Kogyo Kabushiki Kaisha, Osaka, Japan

[22] Filed: Apr. 23, 1974

[21] Appl. No.: 463,366

[30] Foreign Application Priority Data
Apr. 25, 1973  Japan............................... 48-46107
Dec. 28, 1973  Japan............................... 48-1247

[52] U.S. Cl..................................... 204/98; 204/128
[51] Int. Cl.² ....................... C25B 1/16; C25B 1/26
[58] Field of Search............................ 204/98, 128

[56] References Cited
UNITED STATES PATENTS

| | | | |
|---|---|---|---|
| 2,967,807 | 1/1961 | Osborne et al. | 204/98 |
| 3,220,941 | 11/1965 | Osborne | 204/98 |
| 3,438,879 | 4/1969 | Kircher et al. | 204/98 |

*Primary Examiner*—R. L. Andrews
*Attorney, Agent, or Firm*—Cooper, Dunham, Clark, Griffin & Moran

[57] ABSTRACT

Alkali metal hydroxide is produced by electrolysis of alkali metal chloride according to an improved diaphragm process wherein plural cationic ion-exchange membranes are used to divide an electrolytic cell into an anode compartment, at least one middle compartment and a cathode compartment. The ion-exchange membrane confronting anode is preferably substantially resistant to anode reaction products such as chlorine or chlorates. Alkali formed by electrolysis is recovered from cathode compartment or alternatively a portion thereof may be taken out from middle compartments at various concentrations. Alkali metal hydroxide can be produced in high purity and high concentration with excellent efficiency.

8 Claims, 3 Drawing Figures

3,933,603

ELECTROLYSIS OF ALKALI METAL CHLORIDE

This invention relates to a process for producing alkali metal hydroxides, chlorine and hydrogen by electrolysis of aqueous alkali metal chloride solutions. More particularly, it relates to a process for producing aqueous alkali metal hydroxide solutions (hereinafter referred to as "aqueous alkali solution") efficiently in a high concentration with low content of sodium chloride by the use of cation permselective ion-exchange membranes.

The well known mercury and diaphragm processes have been practiced for production of industrially important alkalis and chlorine. These processes have recognized advantages and disadvantages as discussed below. The diaphragm process is advantageous for use in small floor areas because an upright type system is adopted, and also because of its low electric power consumption. On the other hand, the process requires a step for removal of alkali halide, normally sodium chloride, which is coproduced in a mixed solution of alkali. Ordinarily, the procedure produces a product which is contaminated with sodium chloride to the extent of 1 to 2% so that further purification is required.

The mercury process can produce high purity products, but require large floor areas because mercury flowing on a horizontal plane is used as electrode. Moreover, electric power consumption is high. In addition, because mercury is a harmful substance, equipment for protection against leakages is required.

The use of ion exchange membranes for obtaining high purity alkalis with high efficiency in upright installation systems requiring no mercury is an attractive alternative. However, this process has not been used successfully up to this time. One of the reasons is the inadequacy of presently available ion-exchange membranes for producing NaOH at high concentration with good efficiency.

An object of the present invention is to provide a process for producing alkali metal hydroxides in high concentration and high purity with good efficiency by the use of ion-exchange membranes.

The present invention provides a process for electrolysis of alkali metal chlorides, which comprises dividing an electrolytic cell between the anode and cathode into compartments consisting of an anode compartment, at least one middle compartment and a cathode compartment with plural cationic ion-exchange membranes, precharing said cathode compartment with an aqueous alkali metal hydroxide solution with a concentration of 15% or more and said middle compartments with aqueous alkali metal hydroxide solutions which are less concentrated than the solution in said cathode compartment and the solutions in other middle compartments nearer to said cathode compartment, respectively; and flowing electric current between the electrodes, while supplying an aqueous alkali metal chloride solution to said anode compartment, supplying water to said cathode compartment, and removing alkali metal hydroxide from said cathode compartment while maintaining the concentration of the solution in said cathode compartment at the initial level.

As one modification of the above process, water is also supplied to the middle compartments, thereby making it possible to recover alkali metal hydroxides of various concentrations from said middle compartments.

In order that the invention may be clearly understood and readily carried into effect, embodiments thereof will now be described by way of example with reference to the accompanying drawings, in which.

When aqeuous alkali solutions such as aqueous caustic soda solutions having different concentrations are partitioned with one cationic ion-exchange membrane and electrodes are equipped at both sides, the current efficiency of the current flow therebetween depends on the transport numbers of sodium ion and hydroxide ion in the cationic ion-exchange membrane as well as on the diffusion of caustic soda through them. The former is influenced greatly by the concentration of caustic soda at the cathode side, the latter by the difference in concentrations of caustic soda at both sides of the cationic ion-exchange membrane. Accordingly, in order to increase the concentration of aqueous caustic soda at the cathode side, while maintaining a high current efficiency, a very high concentration aqueous caustic soda solution (although, of course, lower than the concentration at the cathode side) may be filled in the anode side, which is in contact with the cathode side via the cationic ion-exchange membrane, to reduce the loss by diffusion.

Figure 1:
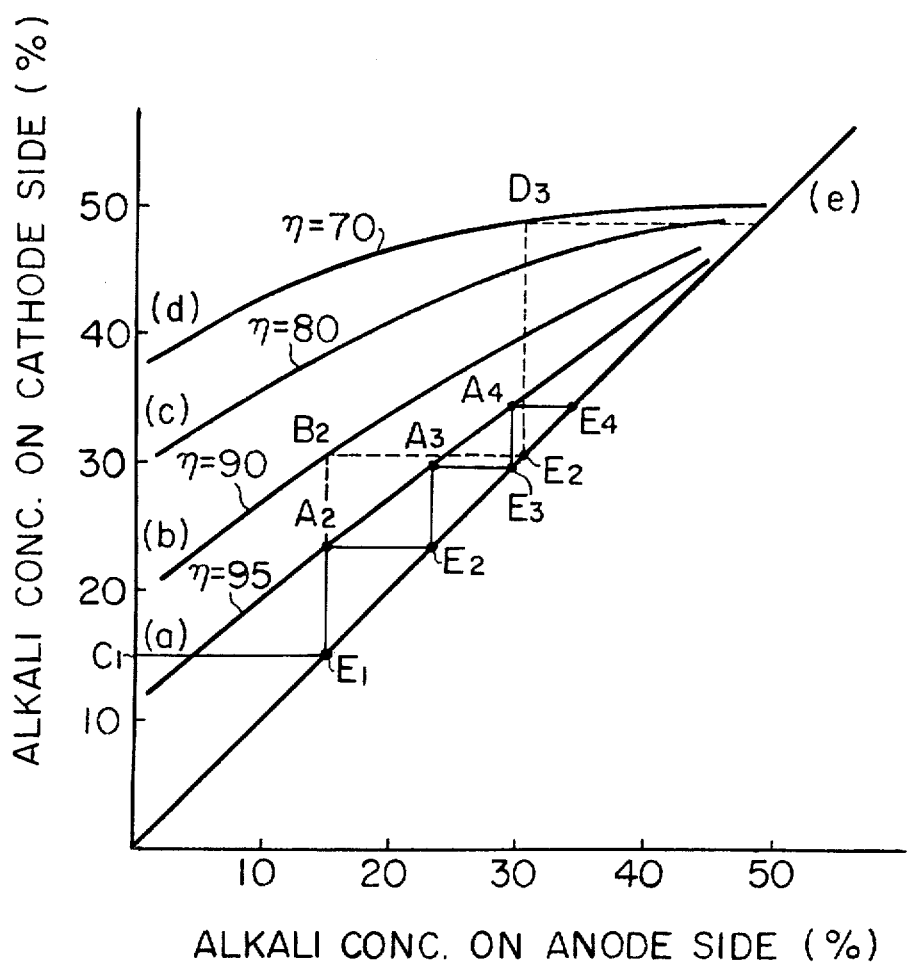
FIG. 1 shows the relation between caustic soda concentration at the cathode side and that at the anode side of a cationic ion-exchange membrane which is required to keep the current efficiency at certain constant values.
Figure 2:
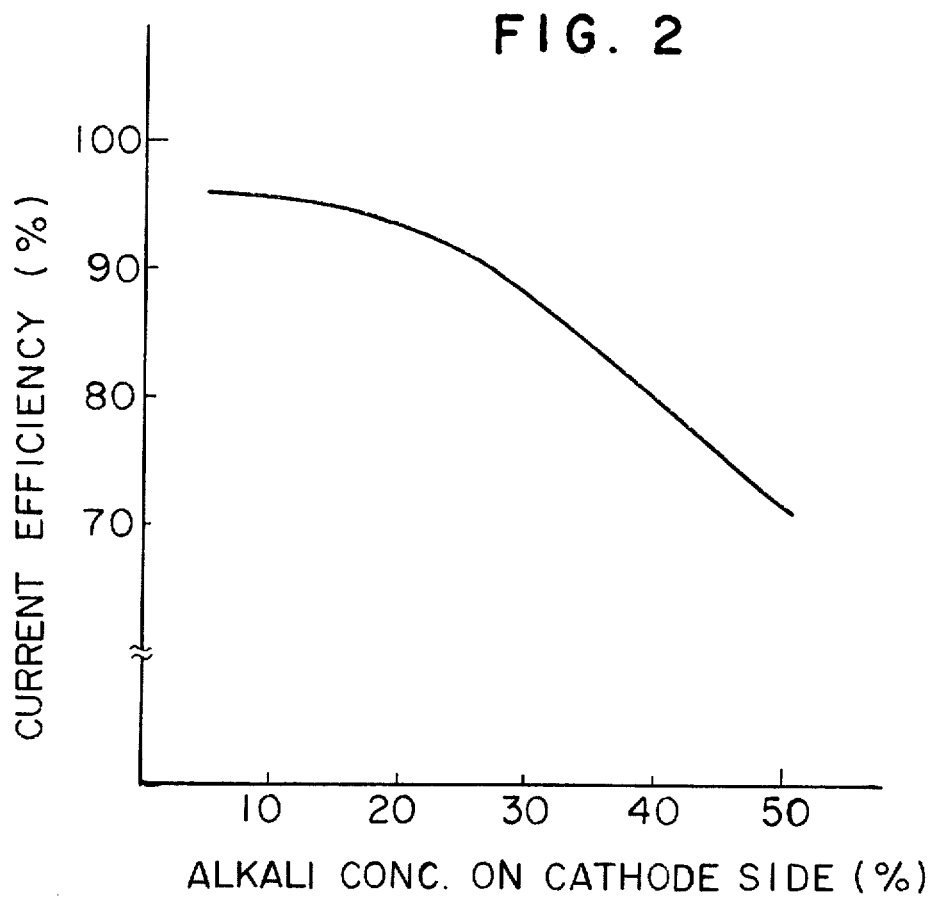
FIG. 2 shows the relation between the caustic soda concentration at the cathode side of a cationic ion-exchange membrane and the current efficiency.
Figure 3:
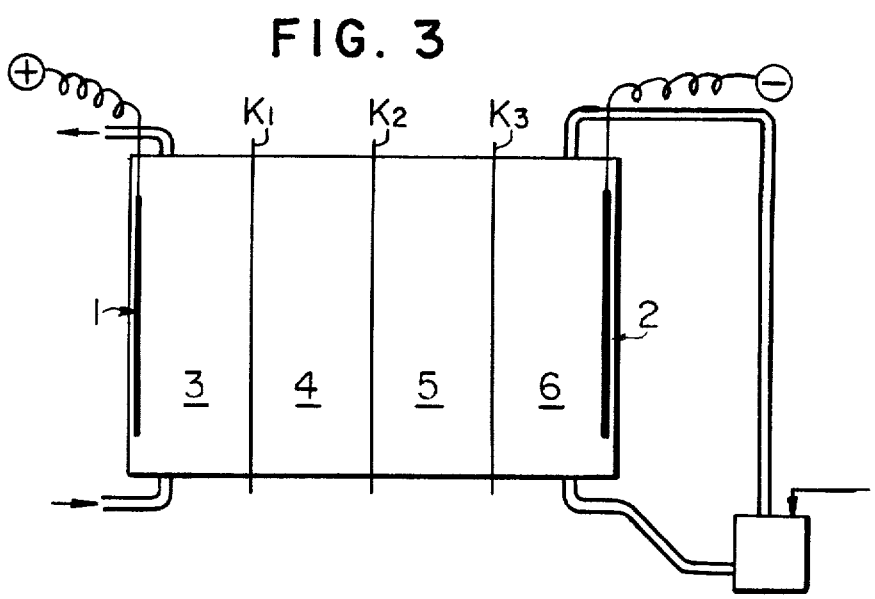
FIG. 3 shows a schematic diagram of one embodiment of an electrolytic cell which is suitable for practicing the process of the present invention, wherein three cationic ion-exchange membranes are used.

Referring now to FIG. 1 which shows the relation determined by experiments between caustic soda concentration at the cathode side and that at the anode side which is required to maintain current efficiency at certain constant values, the curves (a), (b), (c) and (d) denote relations between caustic soda concentration at the cathode side and that at the anode side, when the current efficiencies of the cationic ion-exchange are 95%, 90%, 80% and 70%, respectively. The line (e) is a straight line passing the origin with a gradient of 45°. FIG. 2 shows the relation between the caustic soda concentration at the cathode side of a cationic ion-exchange membrane and the current efficiency, experimentally determined, when an aqueous sodium chloride solution with a concentration of 300 g/l is filled at the anode side of said cationic ion-exchange membrane. FIG. 3 shows a schematic diagram of one embodiment of an electrolytic cell which is suitable for practicing the process of the present invention, wherein three cationic ion-exchange membranes $K_1$, $K_2$ and $K_3$ are used.

The electrolytic cell as shown in FIG. 3 consists of the anode chamber 3, two middle compartments 4 and 5 and the cathode chamber 6 which are partitioned between anode 1 and cathode 2 with three cationic ion-exchange membranes $K_1$, $K_2$ and $K_3$. We now suppose a case wherein electrolysis is performed by filling the anode compartment 3 with, for example, an aqueous sodium chloride solution at a sodium chloride concentration of 300 g/l and filling the middle compartments 4, 5 and the cathode compartment 6 with aqueous caustic soda solutions. In order to attain a current efficiency of 95% at that time, the value of the alkali concentration in cathode compartment 6 to which it must be adjusted and the alkali concentrations in the middle comparments 4 and 5 are determined as follows: From FIG. 2, the alkali concentration in the middle compartment 4 neighboring the anode compartment 3 must be 15%. The alkali concentration in the next middle compartment 5 must be the concentration such that the current efficiency of the cationic ion-exchange membrane $K_2$ may be 95%. Hency, in FIG. 1, the line of the cathode side alkali concentration $C_1=15\%$ is drawn and the point at which this line intersects the line (e) is determined as $E_1$. From $E_1$ is drawn a line parallel to the ordinate axis and the point at which this line intersects the line (a) is determined as $A_2$. The reading on the cathode side alkali concentration corresponding to $A_2$, namely $C_2=23\%$ denotes the alkali concentration at the cathode side (middle compartment 5) to attain current efficiency of 95% for the cationic ion-exchange membrane $K_2$, when the alkali concentration at the anode side (middle compartment 4) is $C_1=15\%$. By a similar procedure, namely by drawing a line parallel to the abscissa axis from $A_2$, determining the intersected point $E_2$ on the line (e), then drawing a line parallel to the ordinate axis from $E_2$, determining the intersected point $A_3$ on the line (a), followed by reading the cathode side alkali concentration corresponding to $A_3$, it is apparent that the alkali concentration in cathode compartment 6 must be adjusted to about 30%.

As described above, when an electrolytic cell having four compartments partitioned with three cationic ion-exchange membranes, caustic soda is obtained from the cathode chamber in a concentration of 30% with current efficiency of 95%, whereby the alkali concentrations in the middle compartments are 15% and 23%, respectively. It is easily estimated from FIG. 1 that the alkali concentration obtained is further increased when the number of partitioned compartments are increased by increasing the number of cationic ion-exchange membranes. Thus, by suitably selecting the number of cationic ion-exchange membranes, an aqueous alkali solution can be obtained in any desired concentration with high current efficiency.

For practice of the present invention, there may be used a unit cell consisting of an anode compartment, at least one middle compartment and a cathode compartment which are partitioned with two or more cationic ion-exchange membranes between electrodes. Alternatively, a multiple cell constructed from a combination of unit cells may also be used.

The anodes and cathodes utilized in this invention may be any of those normally employed in electrolytic cells.

The following is a more specific description of the practice of the invention as applied to the electrolysis of sodium chloride. The anode compartment 3 is filled with an aqueous sodium chloride solution. Said compartment 3 may be arranged in a circulation system, equipped with inlet and outlet tubes. In this circulation system, an aqueous sodium chloride solution is supplied to the anode compartment. After said solution is lowered in concentration by electrolysis, it is taken out of the compartment, and after addition of sodium chloride or removal of impurities, if necessary, recycled again to the anode compartment. An aqueous caustic soda solution of any selected high concentration and a high purity (low sodium chloride content) is filled into the cathode compartment 6. The cathode compartment may also be arranged in a circulation system for circulating an aqueous caustic soda solution which is kept at a constant concentration by removing the caustic soda formed and supplying water from outside the cathode compartment. The middle compartments 4 and 5 which are partitioned with two neighboring cationic ion-exchange membranes, respectively, are filled with aqueous caustic soda solutions having different concentrations. The concentration of the aqueous caustic solution filled in the middle compartment 5 is higher in concentration than that in the middle compartment 4. Each concentration is determined as described above.

In the procedure as described above, the operations are performed while maintaining the middle compartments at equilibrium concentrations so that current efficiencies of the cationic membranes $K_1$, $K_2$ and $K_3$ are equal to each other. In other words, the concentrations of the solutions in the middle compartments are equilibrated so that the alkali coming into each compartment through the cationic ion-exchange membrane at the cathode side and that going out through the cationic ion-exchange membrane at the anode side are equal in amount.

Alternatively, the present process may also be operated by varying the concentration of the middle compartment from the equilibrium concentration thereof so that the cationic ion-exchange membranes differ in current efficiency. For such an operation, a line parallel to the ordinate axis is drawn from $E_1$ to FIG. 1 and the point at which this line intersects the line (b) is determined as $B_2$. From $B_2$ is drawn a line parallel to the abscissa axis and the point intersecting the line (e) is determined as $E_2'$. From $E_2'$ is drawn a line parallel to ordinate axis and the point intersecting the line (d) is determined as $D_3$.

We now suppose a case wherein an aqueous sodium chloride solution with a concentration of 300 g/l is filled in anode compartment 3, an aqueous caustic soda solution with a concentration of 15% in the middle compartment 4, an aqueous caustic soda solution with a concentration of 30.5%, which is the alkali concentration at cathode side corresponding to the point $B_2$, in the middle compartment 5, and an aqueous caustic soda solution with a concentration of 49%, which is the alkali concentration at cathode side corresponding to the point $D_3$, in the cathode compartment 6, respectively. When electrolysis is carried out under these conditions, the current efficiencies of the cationic ion-exchange membranes $K_1$, $k_2$ and $K_3$ become 95%, 90% and 70%, respectively, as seen from FIG. 1. If electrolysis is further continued, the alkali concentrations in the middle compartments change so as to equalize current efficiencies of the three cationic ion-exchange membranes $K_1$, $K_2$ and $K_3$. However, circulation systems may also be adopted for the middle compartments by providing outlets and inlets as in the anode compartment 3 and cathode compartment 6. The caustic soda concentrations in the middle compartments 4 and 5 are maintained at the initial concentrations 15% and 30%, respectively by removal of caustic soda and addition of water similarly as in the cathode chamber 6. When electrolysis is continued under these conditions, caustic soda is removed from the respective middle compartments, in an amount corresponding to the difference between the cationic ion-exchange membranes at the cathode and anode sides of each compartment, as one portion of the caustic soda formed, namely aqueous caustic soda solutions having concentrations of 49%, 30% and 15% are obtained with current efficiency of 70%, 20% and 5%, respectively. As a whole, aqueous caustic soda solutions are obtained with overall current efficiency of 95%.

Any of the usual cationic ion-exchange membranes known to the art may be used in the present invention. Preferably, membranes wherein carboxylic groups are fixed as exchange groups on a polymeric substrate are employed. Such membranes are produced, for example, by copolymerization of divinyl benzene with acrylic acid, anhydride, ester, acid chloride or other derivatives in a suitable solvent. It is also desirable in the present process to use plurality of ion-exchange membranes having different properties. For example, the membrane confronting the anode is selected to be resistant to anode reaction products. Sulfonated ion-exchange membranes derived from fluorine containing compounds such as $\alpha,\beta,\beta$-trifluoro styrene are preferably employed.

Thus, when the process of the present invention is practiced, caustic soda can be produced in various concentrations corresponding to uses.

Although the process of the present invention is described mainly by referring to production of caustic soda by electrolysis of sodium chloride, it is also applicable for other alkali metals in a similar manner.

The following non-limiting examples are given by way of illustration only.

EXAMPLE 1

An electrolytic cell, as shown in FIG. 3, is used in this Example. Membranes derived from a copolymer of acrylic acid and styrene crosslined with divinyl benzene are used for three cationic ion-exchange membranes. A platinum coated titanium plate is used for the anode and a nickel plate for the cathode. The effective area for electric conduction is 10 cm in length and 5 cm in breadth.

The anode compartment is equipped at top and bottom with openings for circulation of aqueous sodium chloride solution. An aqueous sodium chloride solution with a concentration of about 300 g/l is supplied from the opening at the bottom and overflown out of the opening at the top. The cathode compartment is similarly equipped with openings at top and bottom. From a vessel containing aqueous caustic soda solution is supplied the aqueous caustic soda solution to the compartment through the opening at the bottom. The caustic soda overflowing from the opening at the top is recycled in selected amounts to the alkali vessel. During flow of current, the caustic soda concentration is maintained at 30 ± 1% by supplying water to the alkali vessel. The two middle compartments are filled with aqueous caustic solutions, the middle compartment at the side of anode with 15% and that at the side of cathode with 23% aqueous caustic solutions, respectively.

Under these conditions, current is passed at current density of 15 A/dm² for a total 30 hours. The current efficiency, which is determined from the increased amount of caustic soda in the vessel, is 94.7%. The concentrations of caustic soda in the middle compartments are also analyzed after electrolysis and are found to be substantially the same as the initial concentrations, namely 15.3% and 22.6%, respectively.

EXAMPLE 2

The electrolytic cell used in Example 1 is modified so that each of compartments 4, 5 and 6 is equipped with a circulation system for circulating by pump an aqueous caustic soda solution between vessels containing said solution and each middle compartment.

The circulation system for the compartment 4 at the anode side and the circulation system for the compartment 5 at the cathode side are filled with 15 and 30% aqueous caustic soda solutions, respectively. The circulation system for the cathode compartment is filled with 48% aqueous caustic soda solution. The anode compartment is supplied, as in Example 1, with 300 g/l aqueous sodium chloride solution.

Under these conditions, current is passed at current density of 15 A/dm². Each vessel containing aqueous caustic soda solution is maintained at the initial concentration with ± 1% error.

The current efficiencies are determined from the increased amount of caustic soda in each vessel to be 71.0%, 19.1% and 4.3%, respectively. The concentrations of caustic soda in the respective solutions are 48%, 30% and 15%. The overall current efficency is 94.4%.

EXAMPLE 3

An electolytic cell consisting of one unit cell, comprising an anode, a middle and a cathode compartment partitioned with two ion-exchange membranes, is used. As the ion-exchange membrane between the cathode and the middle compartments, there is used a membrane derived from a three-dimensionally crosslinked polymer obtained by crsssslinking acrylic acid-styrene copolymer with divinyl benzene. As the ion-exchange membrane between the anode and the middle compartments, there is used a sulfonated ion-exchange membrane having partially sulfonated bridges which is obtained by treating a membrane polymer $\alpha,\beta,\beta$-trifluoro styrene at about 70°C with excessive amount of chlorosulfonic acid and thereafter boiling the treated membrane in a boiling water overnight. The same cathode and anode as used in Example 1 are used. The structure and the circulation system in the cathode and the anode compartments are also the same as in Example 1. The anode compartment is supplied with 290 g/l of aqueous sodium chloride solution. The alkali concentration in the cathode compartment is maintained at 18 to 21% by supplying water to the vessel containing aqueous caustic soda solution. Under these conditions, current is passed at a current density of 15 A/dm² for 32 hours. The current efficiency determined from the increased amount of alkali is 92.7% in terms of the average current efficiency over the total period. During the current flow, there is a gradual decrease in amount of the alkali solution in the middle compartment. Accordingly, electrolysis is discontinued at the end of each hour, and all of the alkali solution in the middle compartment is drawn out for analysis of alkali concentration. Then, the middle compartment is filled again with an aqueous alkali solution which is prepared to have the same concentration as analyzed, whereupon procedure of starting up electrolysis is repeated. During these operations, the alkali concentration in the middle compartment is found to be invariably within the range of 8 to 9% after 10 hours. The alkali contained no trace of anode reaction products such as hypochlorite ion or chlorate ion.

For comparison, electrolysis is conducted, under the same conditions as in Example 3, in a two-compartment system by using only one membrane of the same type used in Example 3 between the anode and the middle compartments. The current efficiency obtained is 76% (± 3%).

EXAMPLE 4

An electrolytic cell as used in Example 3 is modified in a manner such that the middle compartment, in the same manner as the cathode compartment, is equipped with a system to circulate solution from an alkali vessel to a pump, the middle chamber and again back to the efficiency In order to maintain the concentration of the circulated alkali in the middle compartment at 5% (± 1%) and also to maintain the concentration of the circulated alkali in the cathode compartment at 18 to 21%, water is supplied continuously into each of the vessels which are equipped with circulation systems.

Under these conditions, current is passed at a current density of 15 A/dm$^2$ for 27 hours. The average current efficiency was 87.5% as determined from the increased alkali in the cathode circulation system as 8.2% in the middle circulation system. No trace of anode reaction products such as hydrochlorite ion or chlorate ion are found in the alkali in the middle circulation system.

What is claimed is:

1. A continuous process for the electrolysis of an alkali metal chloride which comprises:
   1. dividing an electrolytic cell into an anode and a cathode compartment with at least one middle compartment, said compartments being separated one from the other by separate cationic ion exchange membranes;
   2. precharging aqueous alkali metal chloride solution of a first concentration into said anode compartment;
   3. precharging aqueous alkali metal hydroxide solution having the same alkali metal as said alkali metal chloride solution into said first middle compartment at a second concentration, the ratio of said second concentration to said first concentration being such as to maintain a preselected current efficiency during electrolysis;
   4. precharging the same aqueous metal hydroxide solution into the cathode compartment at a third concentration which is greater than said second concentration and selected so that the ratio of said second concentration to said third concentration is such as to maintain the said preselected current efficiency during electrolysis; and
   5. applying a voltage across the electrolytic cell while continuously supplying aqueous alkali metal chloride to said anode compartment at said first concentration, and continuously adding water to, while withdrawing alkali metal hydroxide solution from, said cathode compartment at rates so as to maintain said third concentration at a constant value.

2. A process as in claim 1 wherein there is a plurality of middle compartments each precharged with an alkali metal hydroxide solution at different concentrations, the concentrations in each separate compartment being selected to increase with increasing proximity to the cathode compartment all such concentrations being less than the said third concentration in the cathode compartment and being selected so as to maintain said preselected current efficiency.

3. A process as in claim 1 wherein the cationic ion exchange membrane closest to the anode is substantially resistant to anode reaction products.

4. A process as in claim 1 wherein the alkali metal chloride is sodium chloride.

5. A process as in claim 2 wherein the alkali metal chloride is sodium chloride.

6. A process as in claim 5 wherein the number of middle compartments is two, said first concentration is 300 g/l, said second concentration is 15%, the concentration in the second middle compartment is 23%, the third concentration is 30%, and the preselected current efficiency is 95%.

7. A process as in claim 1 wherein water is supplied to at least one middle compartment and alkali metal hydroxide solution is withdrawn therefrom, the concentration of the said alkali metal hydroxide solution being different from the concentration of the alkali metal hydroxide solution withdrawn from the cathode compartment.

8. A process as in claim 6 wherein the alkali metal hydroxide is sodium hydroxide.

* * * * *